(12) United States Patent
Swoboda et al.

(10) Patent No.: US 7,607,047 B2
(45) Date of Patent: Oct. 20, 2009

(54) METHOD AND SYSTEM OF IDENTIFYING OVERLAYS

(75) Inventors: Gary L. Swoboda, Sugar Land, TX (US); Oliver P. Sohm, Toronto (CA); Brian Cruickshank, Oakville (CA); Manisha Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 361 days.

(21) Appl. No.: 11/383,468

(22) Filed: May 15, 2006

(65) Prior Publication Data

US 2006/0259826 A1    Nov. 16, 2006

Related U.S. Application Data

(60) Provisional application No. 60/681,427, filed on May 16, 2005, provisional application No. 60/681,542, filed on May 16, 2005.

(51) Int. Cl.
*G06F 11/00* (2006.01)

(52) U.S. Cl. ......................................................... 714/38

(58) Field of Classification Search ..................... 714/38
See application file for complete search history.

(56) References Cited

U.S. PATENT DOCUMENTS

| | | | | |
|---|---|---|---|---|
| 5,103,394 A | * | 4/1992 | Blasciak | 714/47 |
| 5,450,586 A | * | 9/1995 | Kuzara et al. | 717/124 |
| 6,154,857 A | * | 11/2000 | Mann | 714/30 |
| 6,161,200 A | * | 12/2000 | Rees et al. | 714/38 |

OTHER PUBLICATIONS

Janet Fabri, IBM Corporation, Automatic Storage Optimization, 1979-ACM 0-89791-002-8/79/0800-0083.*

* cited by examiner

*Primary Examiner*—Scott T Baderman
*Assistant Examiner*—Yair Leibovich
(74) *Attorney, Agent, or Firm*—Robert D. Marshall, Jr.; Wade J. Brady, III; Frederick J. Telecky, Jr.

(57) ABSTRACT

A method and system of identifying overlays. At least some of the illustrative embodiments are methods comprising executing a traced program on a target system (the traced program comprising a plurality of overlay programs), obtaining values indicative of which of the plurality of overlays of the traced program has executed on the target system, and displaying on a display device an indication of a proportion of an execution time on the processor of the target system dedicated to each of the plurality of overlay programs.

20 Claims, 4 Drawing Sheets

METHOD AND SYSTEM OF IDENTIFYING OVERLAYS

CROSS-REFERENCE TO RELATED APPLICATIONS

This application claims the benefit of Provisional Application Ser. No. 60/681,427 filed May 16, 2005, titled "Debugging Software-Controlled Cache Coherence," and Provisional Application Ser. No. 60/681,542, filed May 16, 2005, entitled, "Debug Profiling Applications", both of which are incorporated by reference herein as if reproduced in full below.

BACKGROUND

In order to look for errors in software programs (an activity referred to as "debugging"), some software development tools provide the ability to record the sequence of operations that a processor performed while executing a program. In software programs where multiple procedures are used to perform the functionality required of the software program, one or more of the procedures may consume excessive processor time and slow overall system performance. In order to identify which procedures consume excessive processor time, some software developers use a debugging tool known as a "trace-based profiling." A trace is captured data regarding values in various processor registers during execution of a traced program, and the addresses of instructions the processor performed while executing the traced program. Trace-based profiling analyzes the trace data to identify how much time the processor spends executing each procedure. The analysis relies on the assumption that each procedure operates at a unique address, and thus the procedure that is being executed can be uniquely identified by that address.

However, some programs use overlays. 'Overlays' are sequences of code and/or data bytes that are stored in slower (and thus less expensive) memory and are linked to run at a common address range in faster (and thus more expensive) memory, called an 'overlay region'. When a program determines that it needs access to the content associated with an overlay, it copies the content into the faster memory so that it aligns with the addresses at which it was linked run. Over time, a plurality of overlay procedures may thus execute from the same series of addresses. With these types of programs it is difficult to determine which of the many procedures that execute from the overlay region consume excessive processor time.

SUMMARY

The problems noted above are solved in large part by a method and system of identifying overlays. At least some of the illustrative embodiments are computer-readable mediums storing a program that, when executed by a processor of a host system, causes the processor to obtain values indicative of which of a plurality of overlays have executed on a processor of a target system, and display an indication of a proportion of an execution time the processor of the target system dedicated to each of the plurality of overlays during the execution time.

Other illustrative embodiments are methods comprising executing a traced program on a target system (the traced program comprising a plurality of overlay programs), obtaining values indicative of which of the plurality of overlays of the traced program has executed on the target system, and displaying on a display device an indication of a proportion of an execution time the processor of the target system dedicated to each of the plurality of overlay programs.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
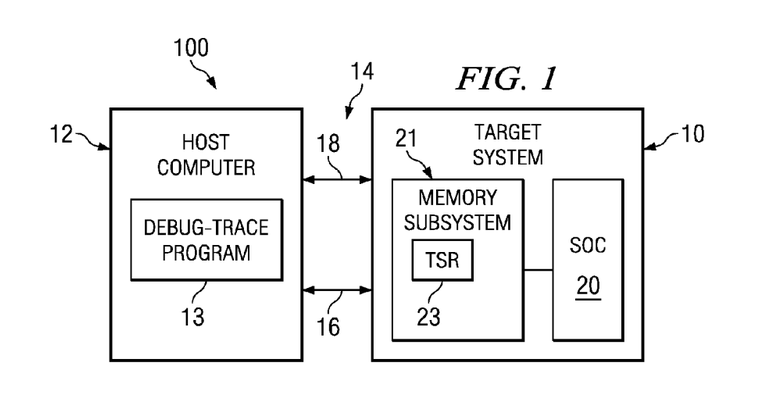
FIG. 1 shows a system in accordance with embodiments of the invention.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer 12 stores and executes a program that is used for software debugging (e.g., gather trace data and produce trace displays), and thus is referred to herein as a software debugger program or a debug-trace program 13.

The host computer 12 and target system 10 couple by way one or more interconnects 14, such as cables. In some embodiments, the host computer 12 couples to target system 10 by way of a multi-pin cable 16, such as a Mictor available from Tektronix Texas, LLC of Richardson, Tex. The multi-pin cable 16 enables transfer of trace data from the target system 10 to the host computer 12. In alternative embodiments, the host computer 12 couples to the target system 10 by way of a serial cable 18 across which the host computer 12 may communicate with a serial communication system of target system 10 (e.g., a joint test action group (JTAG) communication system or a serial direct memory accesses (DMA) transfer protocol). Serial communication between the host computer 12 and target system 10 has lower bandwidth than a multi-pin connection through illustrative cable 16. Thus, in embodiments that rely exclusively on the serial communications, rather than trace or capture every event of a processor within a particular time frame, the statistical sample system (discussed more fully below) of the target system 10 is configured to statistically sample pertinent information, and transfer the statistically sampled data across the communication cable 18. In order to reduce the number of cables required to couple the host computer with the target system, the multi-pin cable 16 may have two or more pins dedicated real-time serial data streams, and thus the host computer 12 and target system 10 may communicate using different protocols, yet over the same multi-pin cable 16.

Figure 2:
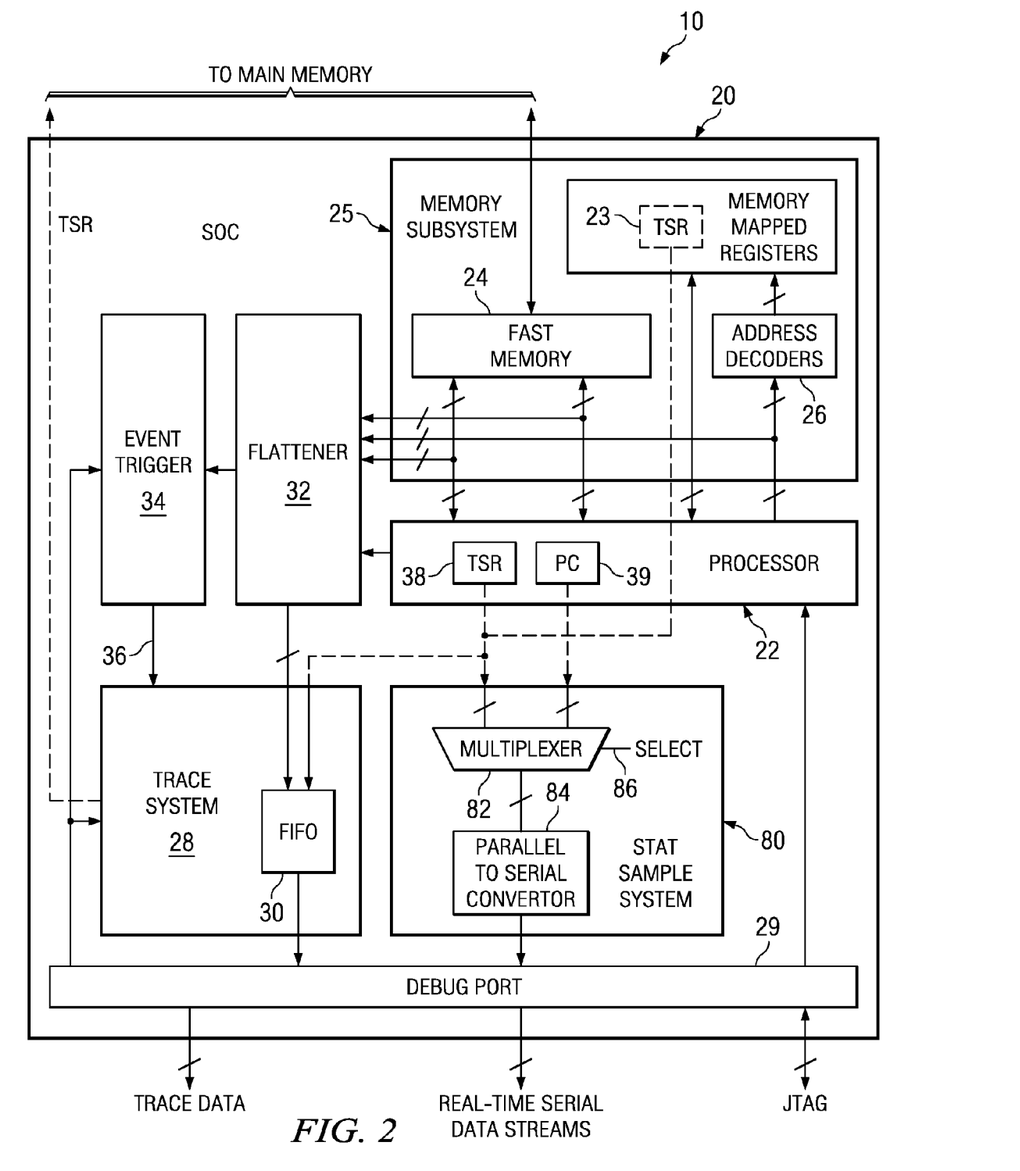
FIG. 2 shows, in greater detail, a target system in accordance with embodiments of the invention.

FIG. 2 shows in greater detail a portion of the target system 10. In particular, a target system 10 in accordance with embodiments of the invention comprises a System-On-A-Chip (SOC) 20. The SOC 20 is so named because many devices that were previously individual components are integrated on a single integrated circuit. For example, the SOC 20 may comprise one or more processors 22, and a memory subsystem 25 that comprises a fast memory 24 and an address decoder 26. The SOC 20 may comprise other devices as well, such as random access memory (RAM), and memory controllers. In accordance with embodiments of the invention, the SOC 20 also comprises a trace system 28. The trace system 28 comprises a First In-First Out buffer (FIFO) 30 in which trace data is gathered. The trace data from FIFO 30 is sent to the host computer 12 (FIG. 1) by the trace system 28 through a debug port 29. Because the processor 22 may perform a plurality of parallel operations, the SOC 20 also comprises a data flattener circuit 32. As the name implies, the data flattener circuit 32 gathers the pertinent trace data from the processor's execution pipeline, serializes or "flattens" the trace data so that events that execute at different stages in the pipeline are logged in the correct sequence, and forwards the trace data to the FIFO buffer 30 in the trace system 28. A non-limiting list of the various data points the data flattener 32 may read, serialize and then provide to the FIFO buffer 30 is: direct memory access (DMA) trace data; fast memory trace data; addresses of opcodes executed by the processor 22; the value of hardware registers in the processor 22; and interrupts received by the processor 22.

Still referring to FIG. 2, in some embodiments the integrated circuit SOC 20 may further comprise an event trigger system 34. The event trigger system 34 couples to the data flattener 32 and receives a least a portion of the serialized data. In response to various pre-programmed triggers (where such triggers may be communicated to the event trigger system 34 by way of serial communications through the debug port 29), the event trigger system 34 asserts a trigger signal 36 to the trace system 28. In response, the trace system 28 accumulates trace data in its FIFO buffer 30 and sends the trace data to the host computer 12 (FIG. 1).

Referring simultaneously to FIGS. 1 and 2, a user of the host computer 12 wishing to debug a software program executable on the target system 10 enables the event trigger system 34. Thereafter, the user initiates the target program on the target system 10. The processor 22 executes the target program, while the data flattener 32 gathers pertinent information, serializes that information, and forwards the pertinent information both the event trigger system 34 and the trace system 28. At points in time before the trace system 28 is enabled by the event trigger system 34, the data supplied to the trace system 28 by the flattener 22 may be ignored or discarded. At a point in execution of the target program, the trigger events occur and the trigger events are identified by the event trigger system 34. The event trigger system 34 asserts the trigger signal 36 to the trace system 28. In response, the trace system 28 collects the trace data in the FIFO buffer 30. Simultaneously with the collecting, the trace system 28 sends the trace data to the host computer 12. In embodiments where all, or substantially all, the events after the assertion of the trigger signal 36 are part of the trace data, the trace system 28 sends the trace data over the relatively high bandwidth multi-pin cable 16. In yet still other embodiments, sending of the trace data from the target system 10 to the host computer 12 may be accomplished by sending data over the serial cable 18 and the relatively high bandwidth multi-pin cable 16. Other embodiments comprise sending the data over an optical interconnect to the host computer, over a local area network (LAN) or the Internet, or logging the captured trace data in a memory or disk that is accessible by the target processor where it can be accessed by another program running on the target processor (e.g., accessed by an embedded software debugging program).

Figure 3:
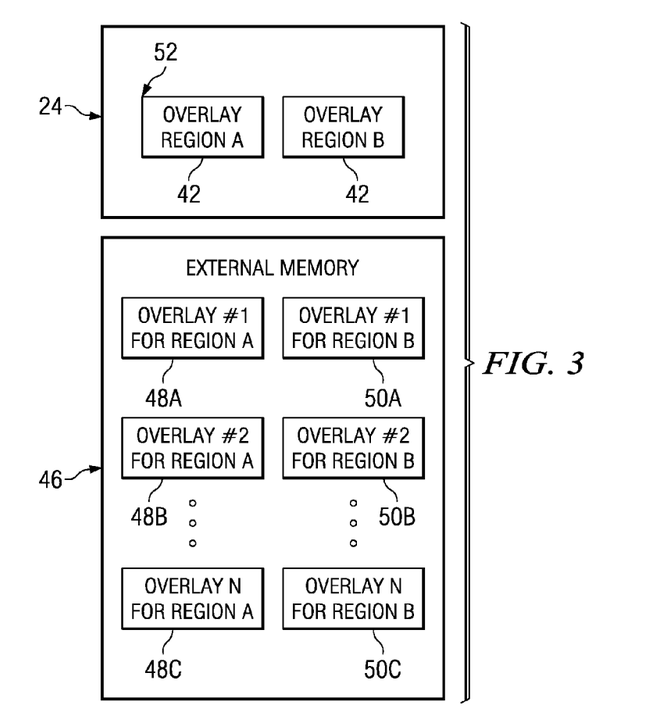
FIG. 3 conceptually shows the relationship between overlay regions and overlay programs.

FIG. 3 conceptually shows the relationship between overlay regions and overlay programs. In particular, FIG. 3 shows a portion of fast memory 24 (also FIG. 2) which could be on the same silicon die as the processor. The fast memory 24 in this illustrative case has two overlay regions, overlay region A 42 and overlay region B 44. FIG. 3 further shows a portion of external memory 46 which has stored therein various overlay programs. In particular, overlay programs 48A through 48C are overlays for overlay region 42. Likewise, overlay programs 50A through 50C are overlays for overlay region 44. In the external memory 46, the overlays are stored at different addresses than where placed in the fast memory for execution. While only three overlays are shown for each overlay region, any number of overlay regions and any number of overlay programs may be equivalently used.

Before execution of overlay programs 48 and 50, an overlay manager copies each overlay program to its respective overlay region and, in some cases, performs dynamic linking of the program so that it can run from within the overlay region. For example, an overlay manager copies overlay program 48A to the overlay region 42, and the processor begins execution of the overlay at the starting address 52. At some other point in time, possibly while the processor executes programs in the overlay region 44, the overlay manager copies the overlay program 48B to the overlay region 42, and the processor begins execution again at the starting address 52. Thus, when viewing addresses of executed opcodes of a traced program that uses overlay programs (where the debug-trace program externally correlates object code versions of the programs to the executed addresses) there is no easily discernable difference between the multiple overlay programs as they are executed from the same addresses.

In order to assist the user of the debug-trace program 13 executed on the host computer 12 in differentiating overlay programs, in some embodiments of the invention the trace system 28 is configured to insert into the trace data values indicative of the identity of the copied/executed overlays. The debug-trace program 13, whether executed on the host computer 12 or as an embedded debugger, extracts the values indicative of the identity of the overlay programs from the trace data which enables the debug-trace program to identify which overlay programs were executed.

Referring to FIG. 2, the trace system 28 obtains the index value from a target state register (TSR). In some embodiments the target state register is a hardware register located within the processor 22, such as target state register 38. Although the hardware register version of the target state register 38 is shown to couple to the trace system 28 (by way of a dashed line), it will be understood that the value of the target state register may, in actuality, be supplied to the trace system after passing through the data flattener 32. A hardware register in the processor 22 may be equivalently referred to as an opcode addressable register. In alternative embodiments, the target state register may be a register outside the processor. For example, the processor 22 may couple to the memory subsystem 25 which implements the target state register 23. In these alternative embodiments, the target state register 23 may be readable by a memory operation to an assigned address, and thus target state register 23 may be referred to as a memory addressable or memory mapped register. In yet still other embodiments, a memory subsystem 21 may be separate from yet coupled to the SOC 20 (FIG. 1). The trace system 28 is configured to send the value in the target state register 23, 38 to the host computer 12 only when the value in the target state register, or a portion thereof, is newly written. Once the target state register has been written to, it becomes the highest priority data item for the trace subsystem to capture, preempting other types of data until it has been read by the trace subsystem. This is done to ensure that the state information (in this case the overlay identity tag) is stored earlier in the captured trace data than the traced values that rely on this information for disambiguation (e.g. program counter values). If the trace stream is disabled for a period of time (e.g. while waiting for a trigger to occur or while waiting for the debugging system to initiate a read of the information), this 'latching' of the information in the target state register 23, 38 ensures that the last value written into the target state register 23, 38 will be presented first in the trace stream once trace data capture is enabled or re-enabled.

In embodiments where the trace system 28 couples to the host computer 12 by way of the relatively high bandwidth connection, the trace system 28 is configured to monitor the value in the target state register 23, 38 and send the value to the host computer system 12 in a message wrapping protocol that identifies to the host computer 12 that the information is the value of the target state register 23, 38. Thus, in these embodiments the values in the target state register are sent across the high bandwidth cable 16 along with other trace data (e.g., direct memory access (DMA) trace data, fast memory trace data, addresses of opcodes executed by the processor 22 (the program counter values), the value of hardware registers in the processor 22, and interrupts received by the processor 22).

In accordance with at least some embodiments of the invention, when the overlay manager writes an overlay program 48, 50 to its respective overlay region 42, 44, the overlay manager also writes a value to the target state register 23, 38 that is indicative of the identity of the overlay program 48, 50. In embodiments were only a single overlay region exists, and where the number of possible overlays is relatively low, the overlay manager writes the value indicative of the identity of the overlay program to the target state register 23, 38 in any predetermined fashion. The newly written target state register value is then sent to the debug-trace program 13. In situations where there are two or more overlay regions (yet where there are still a relatively low number of possible overlays), the various portions of the target state register 23, 38 may be divided into sections, one section each applicable to each overlay.

Figure 4:
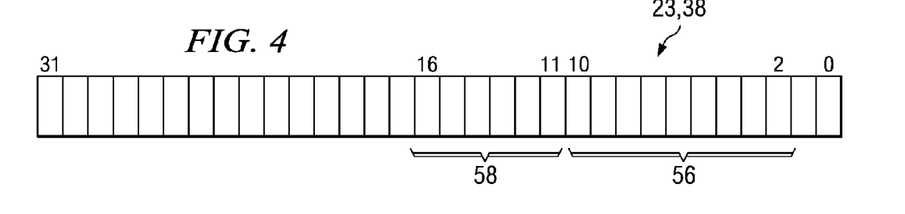
FIG. 4 shows a target state register in accordance with at least some embodiments.

FIG. 4 shows, at the bit level, a target state register 23, 38 in accordance with some embodiments of the invention. In particular, in order to differentiate values indicative of the identity of the overlays in the various overlay regions, the bits of the target state register may be logically divided, each grouping of bits applicable to a particular overlay region. For example, the grouping 56 (bits 2 through 10) may be applicable to overlay region 44 (FIG. 3). Values written to grouping 56 are thus indicative of the identity of the overlay programs for overlay region 44. With grouping 56 having nine bits, the grouping 56 may be used to identify $2^9$ possible overlay programs. Likewise, grouping 58 (bits 11 through 16) may be applicable to overlay region 42 (FIG. 3). Values written to grouping 58 are thus indicative of the identity of the overlay programs for overlay region 42. With grouping 58 having six bits, the grouping 58 may be used to identify $2^6$ possible overlay programs. Although FIG. 4 shows the target state register 23, 38 having two groupings, any number of groupings may be used, limited only by the number of bits in the target state register and the number of possible overlays in each grouping. When the number of overlay regions becomes large or when the number of possible overlay programs becomes large, alternative methods are used.

In order to address situations where there are a large number of overlay regions or overlay programs, and in accordance with some embodiments, the overlay manager program writes an indication of the identity of the overlay to a log buffer. A log buffer may be equivalently referred to as a data table, data array and/or data structure. In some embodiments, data from the log buffer is read out by the host computer 12 after execution of the target or traced program has stopped. In situations where the log buffer does not contain a sufficient number of storage locations to store all the log data written during a trace period (e.g., log buffer has too few locations, or the log buffer is circular and the number of entries expected will overwrite earlier entries during the trace period), the log buffer may be read by the host computer 12 one or more times during the trace period to ensure all the entries generated are available to the debug-trace program.

In some embodiments, the trace system 28, in addition to the FIFO buffer 30, implements a series of memory locations 31 (FIG. 2) to be the log buffer. In alternative embodiments, the log buffer is located in RAM, either on the SOC 20 or in separate RAM 21 (FIG. 1). Regardless of the precise location of the log buffer, the host computer 12 has access to the log buffer and can read data from the log buffer as described above.

The logical construction of the log buffer may take many forms. In some embodiments, the log buffer is implemented as a plurality of equivalently sized data fields. In alternative embodiments, the log buffer is implemented as a plurality of arbitrary sized data fields. In yet still other embodiments, the log buffer is a table having a plurality of rows and columns. Regardless of the logical construction of the log buffer, in accordance with embodiments of the invention each entry in the log buffer comprises an indication of the identity of the overlay, a starting address where applicable, and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written by the overlay manager.

In addition to writing the indication of the identity of the overlay and possibly the index value in the log buffer 31, the overlay manager in accordance with embodiments of the invention also places the index value in the target state register 23, 38. Writing the index value to the target state register contemporaneously with writing the log buffer ensures that the index value is present in the trace data associated with the traced program. In accordance with some embodiments, the debug-trace program 13 in host computer 12 reads the index value from the trace data, indexes into the log buffer data based on the index value, and thus obtains sufficient information to identify the overlay program executed. Attention now turns to how the debug-trace program 13 uses the information regarding identity of the executed overlay programs.

In software programs having multiple overlay programs, one or more of the overlay programs may consume excessive processor time and slow overall system performance. A debug-trace program in accordance with embodiments of the invention uses the values indicative of which of a plurality of overlay programs have executed on the target processor to generate and display an indication of a proportion of an execution time the target processor dedicated to each of the plurality of overlays during the execution time.

Figure 5:
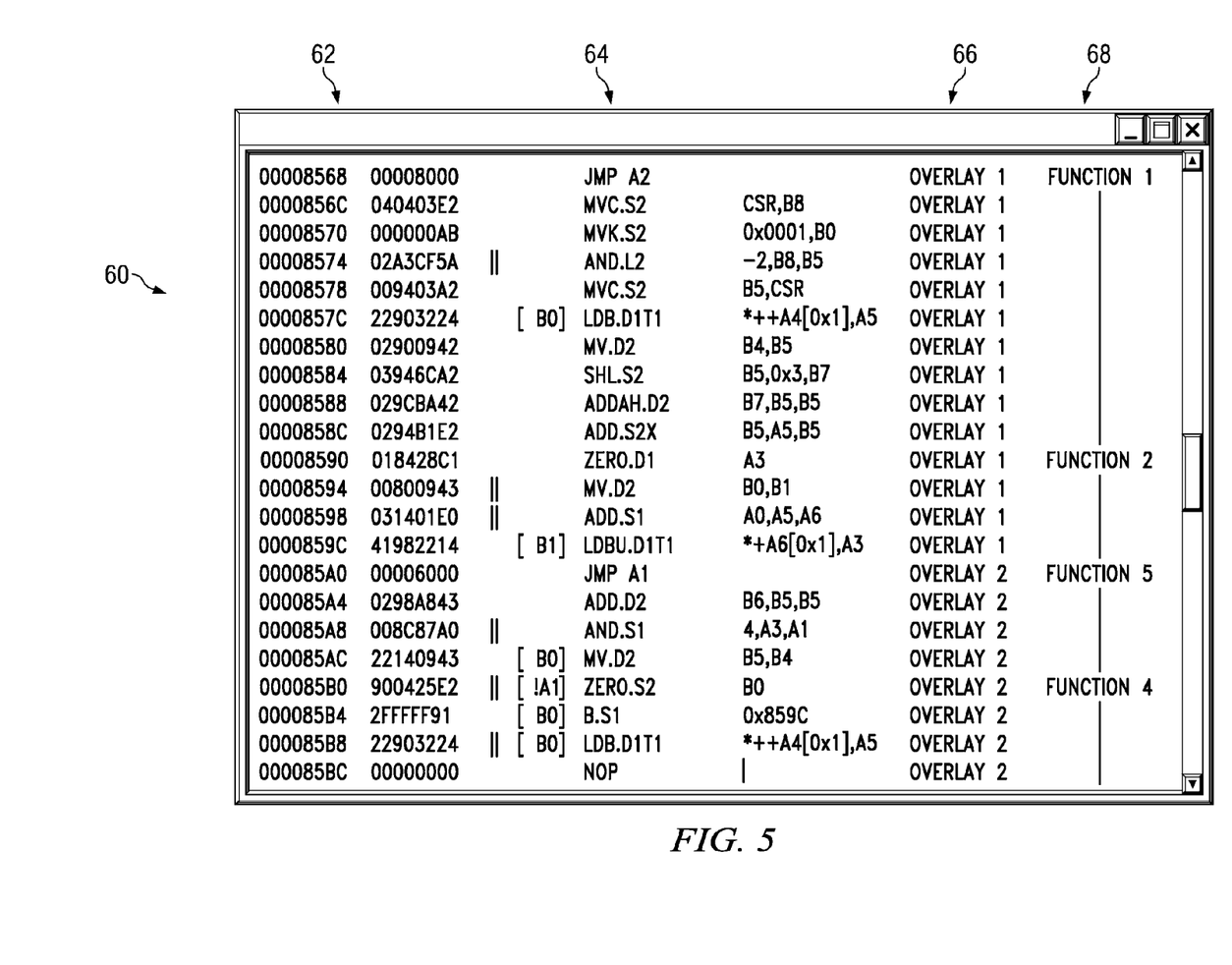
FIG. 5 shows a trace data screen in accordance with some embodiments of the invention.

FIG. 5 shows an illustrative trace data screen 60 that comprises an indication of the proportion of time the target processor dedicated to each of the plurality of overlays. In particular, the trace data screen of FIG. 5 illustrates addresses of executed instructions 60, along with the opcodes 64 of each instruction, and other information. The opcodes pertaining to each instruction may be determined by the debug-trace program 13 by correlating the addresses sent to the host computer 12 to object files of the traced program. FIG. 5 further illustrates that the debug-trace program 13 may also place in the trace data screen 60 an indication of to which of the overlay programs the addresses belong (and in some cases the function of the overlay). In particular, the trace data screen 60 comprises a column 66 which identifies the overlay program, and a column 68 which identifies the function within the overlay program. While only two overlay programs (and two functions each) are shown to have contributed to the trace data screen 60, any number of overlays programs may have contributed and thus may be shown.

Figure 6:
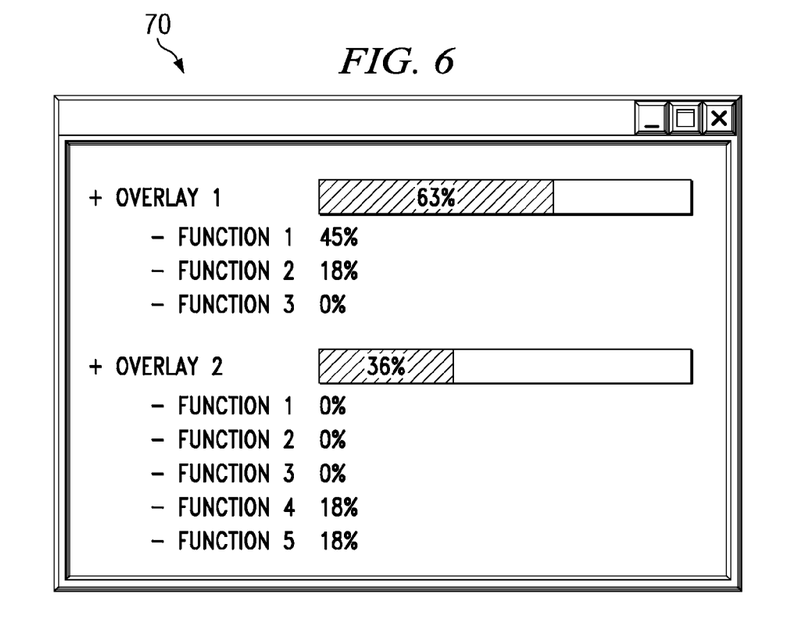
FIG. 6 shows profile screen in accordance with some embodiments of the invention.

Still referring to FIG. 5, for the illustrative twenty-two clock cycles illustrated (ignoring any stalls), overlay program 1 occupied fourteen of the clock cycles, and overlay program 2 occupied eight of the clock cycles. Thus, FIG. 5 also illustrates the proportion of time the target processor dedicated to each overlay program by the number of entries for each overlay program in column 60, and the proportion of time for each function within an overlay program in column 68. FIG. 6 illustrates an alternative profiling screen 70 which shows, for the period of time of the trace data screen 60 of FIG. 5, the percentage of the processor time dedicated to each overlay program, the percentage shown in a bar graph form (with numerical equivalent embedded therein). The profiling screen also shows that the percentage of time spent by each function may also be displayed, in this case only by the numerical percentage. In alternative embodiments, all percentages may be shown as bar graphs with embedded numerical percentages, or just as numerical percentages.

The embodiments discussed to this point utilize trace data gathered by the trace system 28 and transferred over one or both of serial cable 18 or the multi-pin cable 16 to the host computer 12; however, in alternative embodiments the SOC 20 either does not have the ability to gather all the pertinent trace data (e.g., a low cost SOC 20 that does not have the trace system 28, data flattener 32 and event trigger system 34), or the user of the debug-trace program 13 is interested in a smaller subset of the data (possibly in close to real time). Referring again to FIG. 2, in accordance with alternative embodiments the SOC 20 comprises a statistical sample system 20 which enables the alternative embodiments to utilize a method termed herein "statistical profiling."

When statistical profiling, the statistical sample system 80 is configured to periodically read the value of the program counter (which contains the address of the next opcode to execute) from the program counter register 39 and send the value of the program counter to the host computer 12 or an embedded debugger. As discussed above addresses alone may be insufficient to identify to which overlay the address of the program counter represents. In order to address this concern, the alternative embodiments send the value in the target state register 23, 38 in place of the value of the program counter when the value (or a portion thereof) in the target state register 23, 38 is newly written with a value indicative of the identity of the overlay program.

FIG. 2 illustrates that the statistical sample system 80 comprises a multiplexer 82 and a parallel to serial converter 84. The statistical sample system 80 periodically reads a predetermined read address, in these embodiments the output signals of the multiplexer 82. The reading may be by a direct memory access (DMA) engine within the statistical sample system 80, or the DMA engine may be at some other location on the SOC 20. The value from the predetermined read address is provided to the parallel to serial converter 84, and from there is sent to the host computer 12 (e.g., over the serial cable 18). In some embodiments the statistical sample system 80 may be "programmed" by the host computer 12 to periodically read the predetermined memory location, and thus the host computer 12 from that point forward receives the read values without further commands. In alternative embodiments, the host computer 12 may make a request (or read) for each read value.

Still referring to FIG. 2, and with regard to the value in the target state register 23, 38, the multiplexer of the statistical sample system 80 is configured to provide to the predetermined read location the value of the program counter register 39, unless the value of the target state register 23, 38 (or portion thereof) has changed since the last send of the value of the target state register. If the target state register 23, 38 has been written since the last send of the value of the target state register 23, 38 (e.g., an overlay manager program writes the value of an overlay or function within an overlay), then the multiplexer select signal 86 is asserted. On the next read of the predetermined memory address, the value of the target state register is present at the output of the multiplexer 82, and thus the host system is supplied the value of the target state register 23, 38. After the read, but before the next read to the predetermined read address, the statistical sample system de-asserts the select signal 86.

Differentiating the program counter value from the value of the target state register in the host computer 12 takes advantage of the fact that in accordance with at least some embodiments the target system 10 operates based on 16 bit (two byte) instructions aligned on even byte boundaries. Thus, the value of the program counter in accordance with these embodiments consistently has an even value, meaning that the least significant bit of the program counter is zero. In order to differentiate a program counter value from a value from the target state register, the least significant bit of the value of the target state register is assigned to be a logic "1".

Other systems for differentiating program counter values from values of the target state register may be equivalently used.

Using these tools, the host computer 12 (and in particular the debug-trace program 13) may get a statistical sample of values of the program counter during execution of the traced program, and each value of the target state register 23, 38 during the executed program. From this information, the debug-trace program 13 builds a display having an indication of a proportion of an execution time of the target processor is dedicated to each overlay program (and/or function within an overlay program). Although not as exact as the embodiments where each executed address is captured, the embodiments performing statistically sampling still may generate and display indications, such as illustrated in FIG. 6.

In situations where the value indicative of the identity of each overlay program is written directly to the target state register, these embodiments enable a substantially real time view of the proportion of the execution time the target processor dedicates to each overlay program. In embodiments where the value in the target state register 23, 38 is an index value to a log buffer, the host computer 12 may substantially simultaneously read the log buffer (e.g., log buffer 31), and build the display. In yet still other embodiments, the host computer 12 may read the values at the predetermined read location, but not read the log buffer until after execution of the traced program has stopped, and thus the illustrative displays may be constructed after the host computer 12 has read the log buffer.

Figure 7:
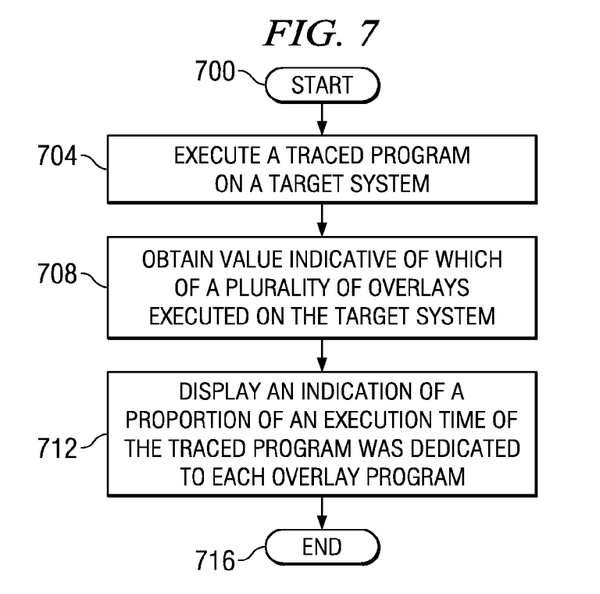
FIG. 7 shows a method in accordance with embodiments of the invention.

FIG. 7 illustrates a method (e.g., software) in accordance with embodiments of the invention. In particular, the process starts (block 700) and proceeds to executing a traced program on a target system (block 704), the traced program comprising a plurality of overlay programs. Thereafter, the method comprises obtaining values indicative of which of the plurality of overlays executed on the target system (block 708). In some embodiments, obtaining the values involves extracting those values directly from the trace data sent from the target system 10 to the host computer 12. In other embodiments, the values in the trace data are index values to entries in a log buffer, which log buffer may be read contemporaneously with the execution of the traced program, or after execution has stopped. In yet still other embodiments, obtaining the values indicative of which of the plurality of overlay programs executed involves statistically sampling a predetermined read location, where the read location provides the value of the program counter, unless the value of the target state register has been newly written.

Regardless of the precise mechanism by which the values indicative of which of the plurality of overlays executed on the target system, the next illustrative step is displaying an indication of a proportion of an execution time of the target processor was dedicated to each overlay program (block 712), and thereafter the method ends (block 716). In embodiments where the host computer 12 receives a full set of trace data, displaying the indication may involve creating columns in the displayed trace data (such as columns 66 and 68 of FIG. 5) which shows how each executed instruction relates to the overlay program and/or function within the overlay program. The embodiments where the values indicative of which of the plurality of overlays executed on the target system are delivered as part of the trace data may also generate a display that shows, on a percentage basis, the time dedicated to each overlay program and/or function, such as shown in FIG. 6. Moreover, in embodiments where program counter and target state register are statistically sampled may also generate a display that shows, on a percentage basis, the time dedicated to each overlay program and/or function, such as shown in FIG. 6.

From the description provided herein, those skilled in the art are readily able to combine software created as described from the methods with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention.

The above discussion is meant to be illustrative of the principles and various embodiments of the present invention. Numerous variations and modifications will become apparent to those skilled in the art once the above disclosure is fully appreciated. For example, although the discussion has assumed that the overlay manager program is responsible for writing the target state register and/or the log buffer, in alternative embodiments the overlay program itself may write the pertinent information when executed. It is intended that the following claims be interpreted to embrace all such variations and modifications.

What is claimed is:

1. A computer-readable medium storing a program that, when executed by a processor of a host system, causes the processor to:
   obtain values indicative of which of a plurality of overlays have executed on a processor of a target system, wherein the overlays are composed of respectively different sets of code and execute from a same address space in the target system; and
   display an indication of a proportion of an execution time the processor of the target system dedicated to each of the plurality of overlays during the execution time.

2. The computer-readable medium as defined in claim 1 wherein when the program obtains the values the program causes the processor of the host system to obtain the values from trace data sent to the host computer, the trace data captured while the traced program was executing.

3. The computer-readable medium as defined in claim 2 further comprising:
   wherein when the program obtains the values the program obtains an index value into a log buffer within the traced system; and
   wherein the program causes the processor of the host system to:
      obtain the log buffer from the target system;
      identify an entry in the log buffer indicated by the index value; and
      identify the overlay based on the entry.

4. The computer readable medium as defined in claim 3 wherein when the program obtains values the program causes the processor of the host computer to obtain the values by reading the log buffer one or more times during the execution time.

5. The computer readable medium as defined in claim 3 wherein when the program obtains values the program causes the processor of the host computer to obtain the values by reading the log buffer after the traced program has ceased execution.

6. The computer-readable medium as defined in claim 1 wherein when the program obtains the values the program causes the processor of the host computer to periodically receive a value from predetermined read location within the target system while the traced program is executing, wherein the predetermined read location contains one selected from the group: a value indicative of which of the plurality of overlays has started execution; or a value of the program counter of the processor of the target system.

7. The computer-readable medium as defined in claim 6 further comprising:
wherein when the program obtains the value the program obtains an index value into a log buffer within the traced system; and
wherein the program causes the processor of the host system to:
obtain the log buffer from the target system;
identify an entry in the log buffer indicated by the index value; and
identify the overlay based on the entry.

8. The computer readable media as defined in claim 1 wherein when the program displays the indication the program causes the processor of the host computer to display a graphical representation of a proportion of the execution time dedicated to each of the plurality of overlays.

9. The computer readable media as defined in claim 8 wherein when the program displays the indication the program causes the processor of the host computer to display a graphical representation of a percentage of the execution time dedicated to each of the plurality of overlays.

10. The computer readable media as defined in claim 1 wherein when the program displays the indication the program causes the processor of the host computer to display a graphical representation of the execution time in processor cycles dedicated to each of the plurality of overlays.

11. A method comprising:
executing a traced program on a target system, the traced program comprising a plurality of overlay programs;
obtaining values indicative of which of the plurality of overlay programs has executed on the target system, wherein the overlay programs are composed of respectively different sets of code and execute from a same address space in the target system; and
displaying on a display device an indication of a proportion of an execution time on the processor of the target system dedicated to each of the plurality of overlay programs.

12. The method as defined in claim 11 wherein obtaining further comprises obtaining the values from trace data, the trace data captured while the traced program was executing.

13. The method as defined in claim 12 wherein obtaining further comprises:
obtaining values from the trace data, each value being an index into a log buffer;
obtaining the log buffer from the target system; and
identifying entries in the log buffer based on the index values, the entries identifying the plurality of overlay programs executed during the execution time.

14. The method as defined in claim 13 wherein obtaining the log buffer further comprises reading the log buffer one or more times during the execution time.

15. The method as defined in claim 13 wherein obtaining the log buffer further comprises reading the log buffer after the traced program has ceased execution.

16. The method as defined in claim 11 wherein obtaining further comprises receiving a value from a predetermined read location within the target system while the traced program is executing, the predetermined read location contains one selected from the group: a value indicative of which of the plurality of overlay programs has started execution; or a value of the program counter of the processor of the target system.

17. The method as defined in claim 16 wherein reading the predetermined read location further comprises reading the predetermined read location over a serial communication pathway.

18. The method as defined in claim 16 wherein obtaining further comprises:
obtaining values being index values into a log buffer;
obtaining the log buffer from the target system; and
identifying entries in the log buffer based on the index values, the entries identifying the plurality of overlay programs executed during the execution time.

19. The method as defined in claim 11 wherein displaying further comprises displaying a graphical representation of a proportion of the execution time dedicated to each of the plurality of overlay programs.

20. The method as defined in claim 19 wherein displaying further comprises displaying a graphical representation of a percentage of the execution time dedicated to each of the plurality of overlay programs.

* * * * *

UNITED STATES PATENT AND TRADEMARK OFFICE
CERTIFICATE OF CORRECTION

| | | |
|---|---|---|
| PATENT NO. | : 7,607,047 B2 | Page 1 of 1 |
| APPLICATION NO. | : 11/383468 | |
| DATED | : October 20, 2009 | |
| INVENTOR(S) | : Swoboda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this

Twelfth Day of October, 2010

David J. Kappos
*Director of the United States Patent and Trademark Office*